United States Patent [19]

Makimoto

[11] Patent Number: 5,625,774
[45] Date of Patent: Apr. 29, 1997

[54] DATA PROCESSING SYSTEM CAPABLE OF DYNAMICALLY CHANGING THE DEFINITION PARAMETERS OF SOFTWARE IN RESPONSE TO CHANGES IN THE NUMBER OF CONNECTED TERMINALS

[75] Inventor: Haruo Makimoto, Kobe, Japan

[73] Assignee: Fujitsu Limited, Kawasaki, Japan

[21] Appl. No.: 252,324

[22] Filed: Jun. 1, 1994

[30] Foreign Application Priority Data

Sep. 6, 1993 [JP] Japan .................. 5-220790

[51] Int. Cl.⁶ .................. G06F 15/16; G06F 15/163
[52] U.S. Cl. .................. 395/200.1; 395/200.09; 395/200.12; 364/DIG. 1; 364/DIG. 2
[58] Field of Search .................. 395/500, 480, 395/700, 737, 650, 309, 828, 800, 200.09, 200.12, 200.1, 200.13; 364/DIG. 1, DIG. 2, 468

[56] References Cited

U.S. PATENT DOCUMENTS

| | | | |
|---|---|---|---|
| 4,679,137 | 7/1987 | Lane et al. | 395/650 |
| 4,827,423 | 5/1989 | Beasley et al. | 364/DIG. 1 |
| 5,113,522 | 5/1992 | Dinwiddie et al. | 395/700 |
| 5,220,654 | 6/1993 | Benson et al. | 395/828 |
| 5,327,560 | 7/1994 | Hirata et al. | 395/700 |

FOREIGN PATENT DOCUMENTS 0340055  2/1993  Japan .

*Primary Examiner*—Daniel H. Pan
*Attorney, Agent, or Firm*—Greer, Burns & Crain, Ltd.

[57] ABSTRACT

Linkage notification section notifies each of definition sections of data for specifying a type of a terminal to be added, changed or deleted and a communication processing parameter about this terminal. The definition section specifies a service processing parameter corresponding to the terminal type among the service processing parameters for service processing software developed beforehand on a main memory. The definition section re-links the communication processing parameter to this specified service processing parameter.

16 Claims, 6 Drawing Sheets

DATA PROCESSING SYSTEM CAPABLE OF DYNAMICALLY CHANGING THE DEFINITION PARAMETERS OF SOFTWARE IN RESPONSE TO CHANGES IN THE NUMBER OF CONNECTED TERMINALS

BACKGROUND OF THE INVENTION

1. Field of the Invention

The present invention relates generally to a data processing system for implementing service processing in accordance with a functionally hierarchized software group while executing the processing for communication with a plurality of terminals connected to the system. The present invention relates more particularly to a data processing system capable of, when the terminal connected is changed, dynamically changing definition parameters required by each set of software in accordance with a simple construction without causing an out-of-synchronism state between respective sets of software.

2. Description of the Related Art

A data processing system implements the service processing in accordance with the functionally hierarchized software group while executing the communication processing for performing communication with the plurality of terminals connected to the system. This data processing system has such a construction that the data needed by the software for controlling the terminal are expanded in the form of definition parameters on a main memory. That is, this data processing system implements the service processing while executing the communication processing for effecting the communication with the terminals in accordance with these definition parameters.

In this type of data processing system, for enhancing a guaranty of an operating schedule and a communication performance, the definition parameters for all sets of software are expanded on the main memory when starting the system, and the communication are carried out. Accordingly, if the terminal as a destination for communication is changed, it is required that the data about the changed terminal is modified by updating the definition parameters expanded on the main memory. This change of the terminal could be as a result of adding connection of a new terminal, changing the type of an already-connected terminal, or disconnecting a (deletion) of the already-connected terminal.

There arise, however, the following problems inherent in updating the definition parameters.

For instance, there exists a construction to take such an arrangement that the definition parameters are re-expanded for updating the definition parameters when changing the connected terminal. If constructed in this way, it follows that the definition parameters of unchanged terminals are also temporarily deleted on the occasion of re-expanding the definition parameters. Hence, it follows that the system is temporarily stopped with the updating of the definition parameters.

Further, the data processing system has, as a software group for implementing the service processing, sets of software offered by a software maker such as a communication access method, a DB monitor (an on-line transaction monitor for accessing to a database), a DC monitor (an on-line transaction monitor for executing data communication) and also application programs developed by users. These sets of software are mutually functionally hierarchized. Accordingly, there exists a possibility in which an out-of-synchronism state is caused between the respective sets of software. The "out-of-synchronism state" termed herein is a state where a parameter definition in the software of another hierarchy is, although the parameter definition in the software of one hierarchy has been modified, not yet modified, and hence the service can not be implemented. In general, the software offered by the software maker is capable of taking the synchronism with other software offered by the same maker with measures taken by this software maker. The definition parameters possessed by the software developed by the user would be original different from the definition parameters possessed by the software offered by the maker. For this reason, with the updating of the definition parameters, there is a possibility in which the out-of-synchronism state will be produced between the software developed by the user and the software offered by the software maker and between sets of software developed by the users.

For dealing with the problems given above, the conventional data processing system has hitherto adopted such a method that all the terminals which would be destinations for communication are defined beforehand, and the definition parameters corresponding thereto are previously expanded on the main memory. Further, in some cases, the conventional data processing system has taken such a method that the definition parameters are concentratedly managed by a network directory, and each software reads the concentratedly managed definition parameters. The conventional data processing system thus makes unnecessary the updating of the definition parameters.

If a data processing system conforms with the pre-definition method as in the former case, however, each software inquiries an unsubstantial communication destination terminal which is previously defined but not yet connected to the data processing system. Therefore, a problem is caused, wherein a futility is produced in the communication. Further, the terminals are further added, and consequently all the pre-definitions made beforehand are used up (i.e., all the pre-defined terminals are actually connected to the data processing system). In this case, there arises a necessity for effecting the pre-definition once again. This therefore presents such a problem that the system has to be stopped.

Besides, if a data processing system conformed with the method of using the network directory as in the latter case, the system itself increases in size. Moreover, each time the program of the software is executed, the definition parameters are read from this network directory, resulting in a deterioration in terms of performance. A cashing process (a reading process such as periodic reading) is therefore required. Accordingly, the problem is that the system processing becomes complicated.

SUMMARY OF THE INVENTION

The present invention has been devised under such circumstances. Namely, a premise of the present invention is a data processing system adopting a construction for implementing service processing in accordance with a functionally hierarchized software group while executing the processing for communication with a plurality of terminals connected to the data processing system. It is an object of the present invention to provide a new data processing system capable of, even if such a construction is adopted, dynamically changing definition parameters required by each software in accordance with the simple construction without inducing an out-of-synchronism state when the terminal is changed.

According to one aspect of the present invention, there is provided a data processing system for implementing service processing while executing the processing for communication with a plurality of terminals connected to the system. The data processing system comprises a expanding element for expanding a service processing parameter needed by a software group for executing the service processing while relating the service processing parameter to the software group. The data processing system also comprises a receiving element for receiving, when the terminal to be connected is added, a communication processing parameter required for the communication processing with the added terminal and data for specifying the service processing executed with respect to the added terminal. The data processing system further comprises a registering element for registering the communication processing parameter received by the receiving element while linking the communication processing parameter to the service processing parameter corresponding to the service processing specified by the service specification data received by the receiving element.

BRIEF DESCRIPTION OF THE DRAWINGS

The present invention will becomes more fully understood from the detailed description given hereinbelow and the accompanying drawings which are given by way of illustration only, and this are not limitative of the present invention, and wherein.

DESCRIPTION OF THE PREFERRED EMBODIMENTS

First Embodiment

Figure 1:
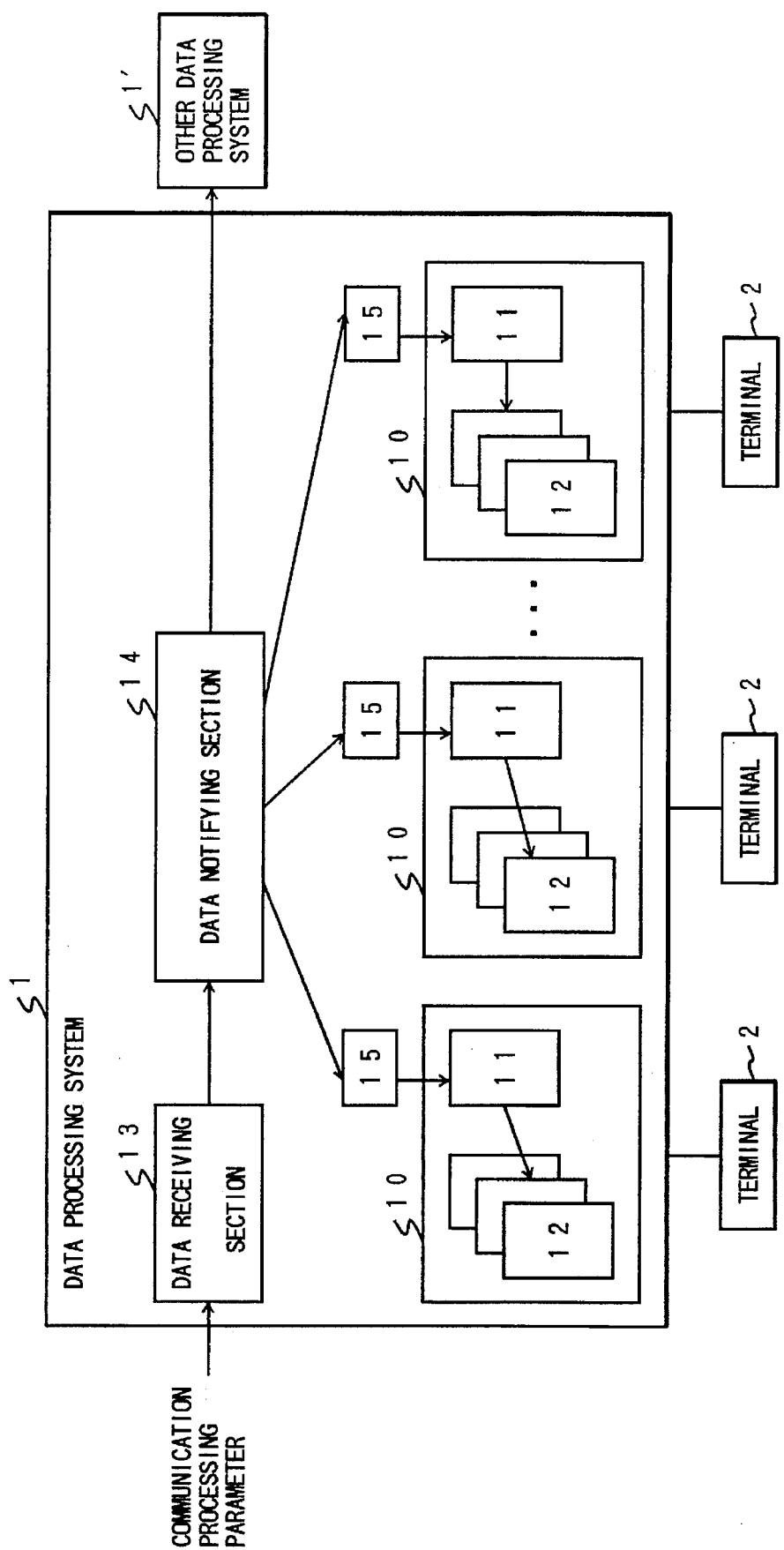
FIG. 1 is a block diagram illustrating a data processing system in a first embodiment of the present invention.

FIG. 1 illustrates a construction of a data processing system in a first embodiment of the present invention. This data processing system 1 is actualized in the form of a host computer in, e.g., a banking system.

Referring to FIG. 1, the data processing system 1 is connected to a plurality of terminals 2. This terminal 2 in the example of the banking system corresponds to, e.g., a cash dispenser, an ATM (Automatic Teller Machine), etc. The data processing system 1 implements service processing in accordance with sets of functionally hierarchized software 10 while executing communication processing for performing communication with those terminals.

Each software 10 of the mutually functionally hierarchized software group which is to be developed in the data processing system 1 includes a program for implementing the serving processing while effecting the communication with the terminals 2. Each software 10 takes such a structure that definition parameters required for implementing the serving processing are expanded and separated into communication processing parameters and service processing parameters. The communication processing parameters are necessary for the processing for the communication between the system 1 and terminals 2. The service processing parameters are needed for the service processing between the system 1 and the terminals 2.

This communication processing parameter is a parameter representing an item of hardware data of a terminal 2 conceived as a destination for communication such as communication capability. A reference to the communication processing parameter is done by each software when executing the communication processing between the system 1 and the respective terminals. Accordingly, this communication processing parameter is an item of data depending on the terminal. Namely, this communication processing parameter differs in terms of contents according to every terminal 2 to be connected. Hence, this communication processing parameter is developed in a communication processing parameter area 11 while being dynamically changed in accordance with a change, an addition and a deletion of the terminal 2. This communication processing is one of a multiplicity of services executed by each software 10, and therefore, one communication processing parameter area 11 is prepared for every software.

The service processing parameter is a parameter to control an operation of the terminal conceived as a destination for communication such as a parameter relative to a type of message transmitted when a failure of the terminal 2 is caused. The service processing parameter is prepared corresponding to a service executed by each software 10. Therefore, this service processing parameter is an item of data which does not depend on the terminal 2. That is, this service processing parameter is the parameter for processing in an interior of the data processing system 1 which is not influenced by a type of the terminal 2. Accordingly, this service processing parameter is developed fixedly in a service processing parameter area 12. Prepared per software 10 are the same number of service processing parameter areas 12 as the number of services executed by each software.

A data receiving section 13 developed in the data processing system 1 works as an data receiving means. The data receiving section 13, when the terminals 2 are added, changed and deleted, receives the data about types of these terminals from the outside of the data processing system 1. Further, when the terminals 2 are added and changed, the communication processing parameters possessed by those terminals 2 are received from the outside of the data processing system 1. This data receiving section 13 may be developed in one set of software 10 of the functionally hierarchized software group in some cases. Note that these items of data are inputted by an operator via a data input device provided outwardly of the data processing system 1 or read and inputted from a medium such as a magnetic disk, etc., via a disk device.

A data notifying section 14 conceived as an notifying means developed in the data processing system 1 notifies each set of the software 10 of the data received by the data receiving section 13. This notifying section 14, if there is the software 10 which is being suspended, notifies all other sets of software 10 of the data as an object for notification and thereafter temporarily saves the data. That is, the data notifying section 14 holds the data. Thereafter, the data notifying section 14, when the software 10 which was suspended is started, notifies this software 10 of the saved data. Further, preferably, the data notifying section 14 selects the software 10 according to an implement sequence of the service processing. The data notifying section 14 then notifies the software 10 of the data received by the receiving section 13 in accordance with a selection sequence thereof. The data notifying section 14 may also inform other data processing systems 1', performing services related with that of the system 1, of the data received by the receiving section 13 in some cases.

A data registering section 15 developed in the data processing system 1 works as a developing/registering means. The data registering section 15 is provided corresponding to each set of software 10. The data registering section 15 may be developed in each set of software 10. This data registering section 15 previously develops the service processing parameters in the service processing parameter area 12. The data registering section 15, at the same time, executes a dynamic changing process of the communication processing parameters developed in the communication processing parameter area 11 of each software 10.

In the data processing system 1 in accordance with the first embodiment, if the terminal 2 is added, changed and deleted, the data receiving section 13, for example, interacts with the operator and thereby receives a terminal type (that is, data representing service processing related to the terminal). Further, the data receiving section 13 similarly, when the terminals 2 are added and changed, receives the communication processing parameters relative to those terminals 2. The data notifying section 14 notifies each registering section 15 of each item of data received by this receiving section 13.

When the data notifying section 14 notifies the data registering section 15 of the data received by the data receiving section 13 in this way, the data registering section 15 specifies the service processing related to the terminal 2 to be added, changed and deleted in accordance with the notified terminal type and specifies the service processing parameter related to that terminal 2 based on the specified service processing. Namely, a determination as to what kind of service is performable is made depending on the type of the terminal 2 (a cash dispenser, an ATM, etc.). It is therefore required that each set of software 10 should specify and link (the service processing parameter for) one of the services to each of the terminals 2 connected to the data processing system 1.

Specifically explaining the link processing, the data registering section 15, when the terminal 2 is added and changed, links the communication processing parameter relative to the notified terminal 2 to the service processing parameter specified for every terminal 2 as described above. Further, if the terminal 2 is deleted, the communication processing parameter relative to the deleting target terminal 2 is deleted, which is linked to the service processing parameter specified for every terminal 2 as described above. In this manner, each data registering section 15 dynamically changes the communication processing parameter developed in the communication processing parameter area 11 of the corresponding software 10. As a result, the communication processing parameter and the service processing parameter are linked for every software or for every terminal 2 and dealed with as definition parameters for executing the program of the software 10. With this processing, it is secured that the definition parameters are separated into the communication processing parameters and the service processing parameters.

As discussed above, the data processing system 1 in accordance with this embodiment adopts the construction for implementing the service processing according to the functionally hierarchized software group 10 while executing the communication between the system 1 and the plurality of terminals 2 connected thereto. In the data processing system 1, when the terminal 2 connected to this data processing system 1 is changed, the definitions parameters required by each software 10 can be dynamically changed without causing a out-of-synchronism state in accordance with the simple construction.

Second Embodiment

Figure 2:
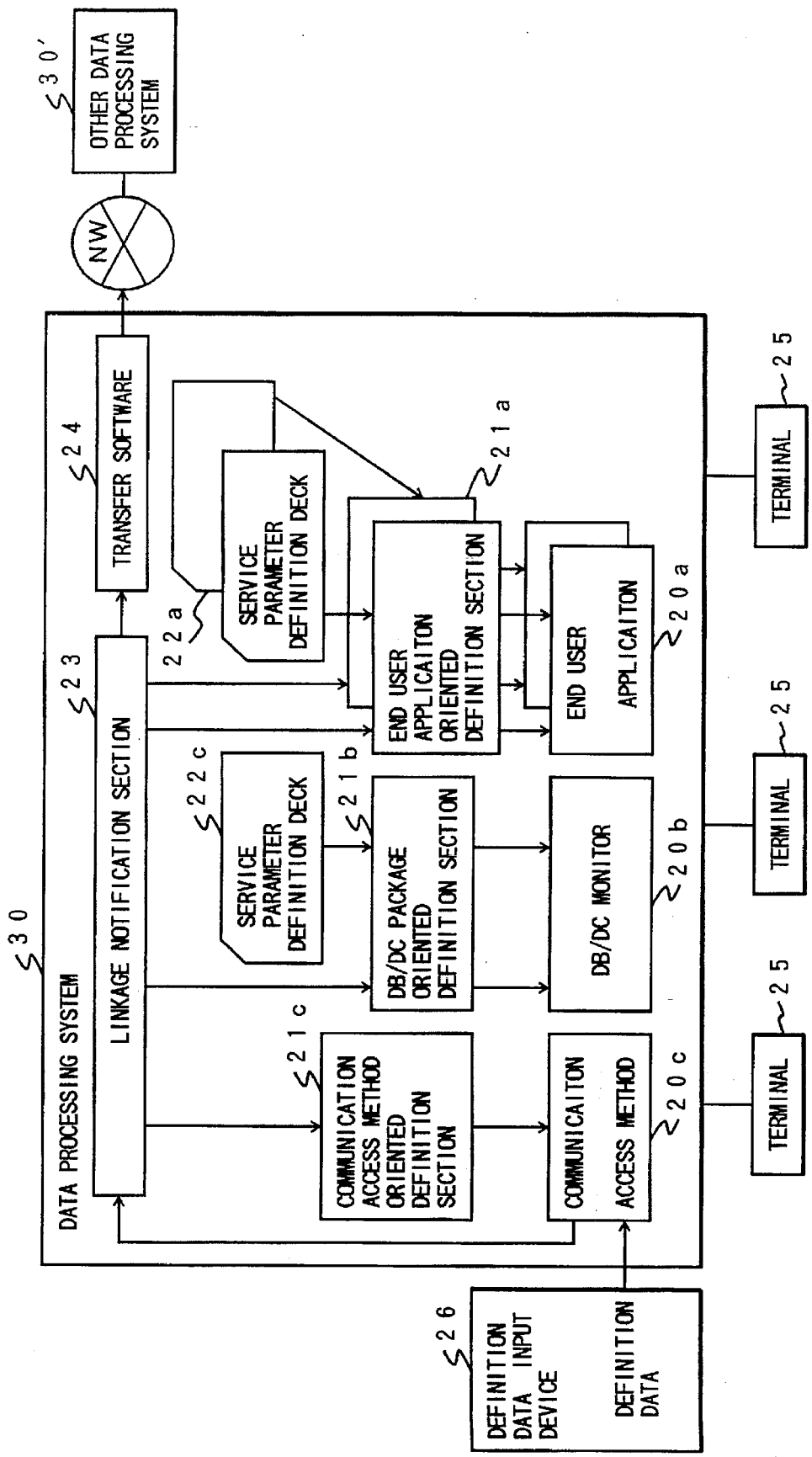
FIG. 2 is a block diagram illustrating the data processing system in a second embodiment of the present invention.

FIG. 2 is a block diagram illustrating a system construction of the data processing system 30 in accordance with a second embodiment of the present invention. In this second embodiment, the data processing system of the present invention is applied to a host computer constituting a banking system.

Referring to FIG. 2, a plurality of terminals 25 and a definition data input device 26 are connected to a data processing system 30. The data processing system 30 is also connected via a communication network NW such as LAN, WAN, etc. to other data processing system 30'.

The terminal 25 is one of a cash dispenser, an ATM, a teller's window input device, etc. in the banking system. The respective terminals 25 have functional differences from each other, depending on the types thereof.

A definition data input device 26 is a console for inputting "definition data" about each terminal 25 to the data processing system 30. This item of "definition data" is inputted when newly adding the terminal 25 connected to the data processing system 30, when changing the type of the already-connected terminal 25 into a different type and when deleting the already-connected terminal 25. The "definition data" contain data for specifying ID of the adding/changing/deleting target terminal 25. The "definition data" also contain data for specifying whether an event occurred is the addition, the change or the deletion of the terminal 25. The "definition data" further contain data for specifying a type (a terminal type after being changed when the event is the change of the terminal) of the adding/changing/deleting target terminal 25. The "definition data" still further contain the communication processing parameter (that is not required when the event is the deletion of the terminal) about the adding/changing target terminal 25. This communication processing parameter is a parameter for representing the hardware data of a terminal 25 as a destination for communication such as communication capability.

Explaining the other data processing system 30' by way of an example of the banking system, the system 30' corresponds to a host computer system in a branch office in a case where the data processing system 30 is conceived as a host computer of a head office.

Referring to FIG. 2, plural sets of software 20, more specifically, one or a plurality of end user applications 20a, a DB/DC monitor (on-line transaction monitor) 20b, and a communication access method 20c are loaded on an unillustrated main memory of the data processing system 30. These sets of software 20 take a mutually functionally hierarchized structure, wherein the service processing of each software's own is implemented while the communication processing between the system 30 and terminals 25 is executed. Note that a "representative software" selected from those sets of software 20 receives the "definition data" from the definition data input device 26. That is, the "representative software" is the software which performs the function corresponding to the data receiving section 13 in the first embodiment and corresponds to, i.e., the receiving means. In FIG. 2, the communication access method 20c is selected as the "representative software".

One or a plurality of end user application oriented definition sections 21a each serving as a developing/registering means are provided corresponding to each of the end user applications 20a. This end user application oriented definition section 21a develops and registers the definition parameter needed for implementing the service processing with respect to the corresponding end user application 20a. A DB/DC monitor oriented definition section 21b serving as a developing/registering means develops and registers the definition parameter required for implementing the service processing with respect to the DB/DC monitor 20b. A communication access method oriented definition section 21c develops and registers the definition parameter necessary for implementing the service processing with respect to the communication access method 20c. The definition parameter registered in the end user application 20a includes a communication processing parameter and a service processing parameter. The definition parameter registered in the DB/DC monitor 20b includes the communication processing parameter and the service processing parameter. The definition parameter registered in the communication access method 20c includes the communication processing parameter. The service processing parameter connoted herein is a parameter to control the operation of the terminal 25 as a destination for communication such as a parameter relative to types of messages transmitted when a failure of the terminal is caused.

One or a plurality of service oriented parameter definition decks 22a constituting a part of the developing means are provided corresponding to each of the end user application oriented definition sections 21a. This service oriented parameter deck 22a is a storage for previously storing and collectively managing the service processing parameters registerable in the end user applications 20a. A single piece of service oriented parameter definition deck 22b constituting a part of the developing means is provided for the DB/DC monitor oriented definition section 21b. This service oriented parameter definition deck 22b is a storage for previously storing and collectively managing the service processing parameters registrable in the DB/DC monitor 20b.

A linkage notification section 23 serving as a notifying means receives the "definition data" transferred from the communication access method 20c conceived as the "representative software". The linkage notification section 23 then creates an item of "notification data" inclusive of respective items of data contained in the "definition data". The linkage notification section group 23 notifies the end user application oriented definition sections 21a, the DB/DC monitor oriented definition section 21b and the communication access method oriented definition section 21c of the thus created "notification data". The linkage notification section 23 also notifies the transfer software 24 for the "notification data".

The transfer software 24 is conceived as communication software for transferring the "notification data" notified by the linkage notification section 23 to other related data processing systems 30'. This transfer software 24 transforms a format of the "notification data" in accordance with a type of the communication network NW and, at the same time, functions to transfer the "notification data" by driving an unillustrated communication device.

This embodiment takes such an arrangement that the definition parameters required by each software 20 to implement the service processing are clearly separated into the communication processing parameter and the service processing parameter and are expanded on the main memory. It is therefore possible to exert no influence of the addition, the change and the deletion of the terminals 25 on the service processing parameters. The independence of the service processing parameter is thus realized. The service processing parameter for each end user application 20a is read by the corresponding end user application oriented definition section 21a from the corresponding service oriented parameter definition deck 22a and then expanded in the end user application 20a when the data processing system 30 actuates or when the relevant end user application 20a actuates. The service processing parameter for the DB/DC monitor 20b is read by the DB/DC monitor oriented definition section 21b from the service oriented parameter definition deck 22b and expanded in the DB/DC monitor 20b when the data processing system 30 actuates or when the DB/DC monitor 20b actuates.

On the other hand, the communication processing parameter needed by each software 20 is contained in the "definition data" (limited to the definition data of which data for specifying the event indicates the addition or the change of the terminal). The "definition data" is received by the "representative software" (the communication access method 20c) interacting with the operator via the definition data input device 26. The "representative software (the communication access method 20c)" transfers the "definition data" to the linkage notification section 23.

The linkage notification section 23 notifies the end user application oriented definition section 21a, the DB/DC monitor oriented definition section 21b and the communication access method oriented definition section 21c of those needed among the transferred communication processing parameters in the form of the "notification data". Each definition section 21 receiving the notice of the "notification data" expands the communication processing parameters contained in the "notification data" on areas of the main memory with respect to the end user applications 20a, the DB/DC monitor 20b or the communication access method 20c.

On this occasion, each definition section 21 specifies ID of the terminal 25 corresponding to the communication processing parameters on the basis of the "notification data". Then definition section 21 then expands the communication processing parameters while relating it to the ID of this terminal 25 (Accordingly, a plurality of communication processing parameters related the different terminals 25 can be expanded on the areas of the main memory with respect to the same software 20). Further, the definition section 21 (confined to the end user application oriented definition section 21a and the DB/DC monitor oriented definition section 21b) specifies the service processing parameter relative to the terminal 25 corresponding to the expanded communication processing parameter, on the basis of the "terminal type" which is contained on the "notification data". The definition section 21 then links the specified service processing parameter to the expanded communication processing parameter.

Note that if the event-specifying data contained in the "notification data" indicates the deletion of the terminal (in this case, the communication processing parameter is not contained in the "notification data"), the definition section 21 specifies the terminal 25 relative to the "notification data" on the basis of the ID data of the terminal 25 which is contained in the "notification data". Then, the definition section 21 deletes the communication processing parameter related to this terminal 25 from the area of the main memory with respect to the corresponding software 20. On this occasion, the definition section 21 (limited to the end user application oriented definition section 21a and the DB/DC monitor oriented definition section 21b) specifies the service processing parameter relative to the terminal 25 associated with the "notification data" on the basis of the "terminal type" data contained in the "notification data". The definition section 21 then delinks the specified service processing parameter from the communication processing parameter relative to the terminal 25.

Each definition section 21, if the corresponding software 20 is suspended, saves the service processing parameter and the communication processing parameter onto an unillustrated file (a storage medium such as a hard disk, etc.) together with a linkage relationship therebetween and the ID data of the terminal 25, the above service and communication processing parameters being expanded on the areas of the main memory with respect to this software 20. Subsequently, each definition section 21, when restarting the corresponding software 20, re-expands the service and communication processing parameters saved onto the unillustrated file on the areas of the main memory with respect to this software 20 together with the linkage relationship therebetween and the ID data of the terminal 25.

Figure 3:
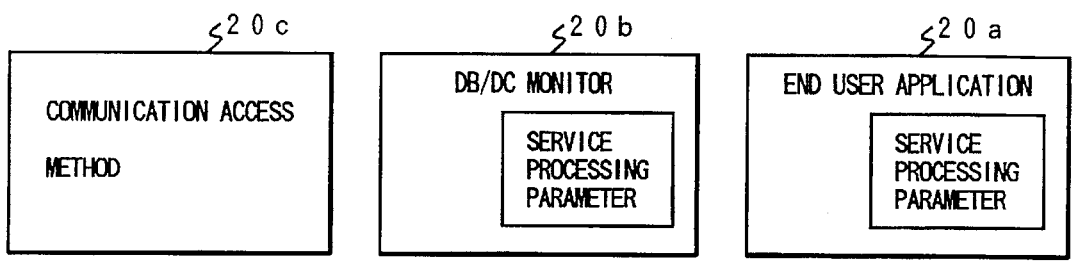
FIG. 3 is a processing explanatory diagram of assistance in explaining the processing executed in the data processing system in the second embodiment of this invention.
Figure 4:
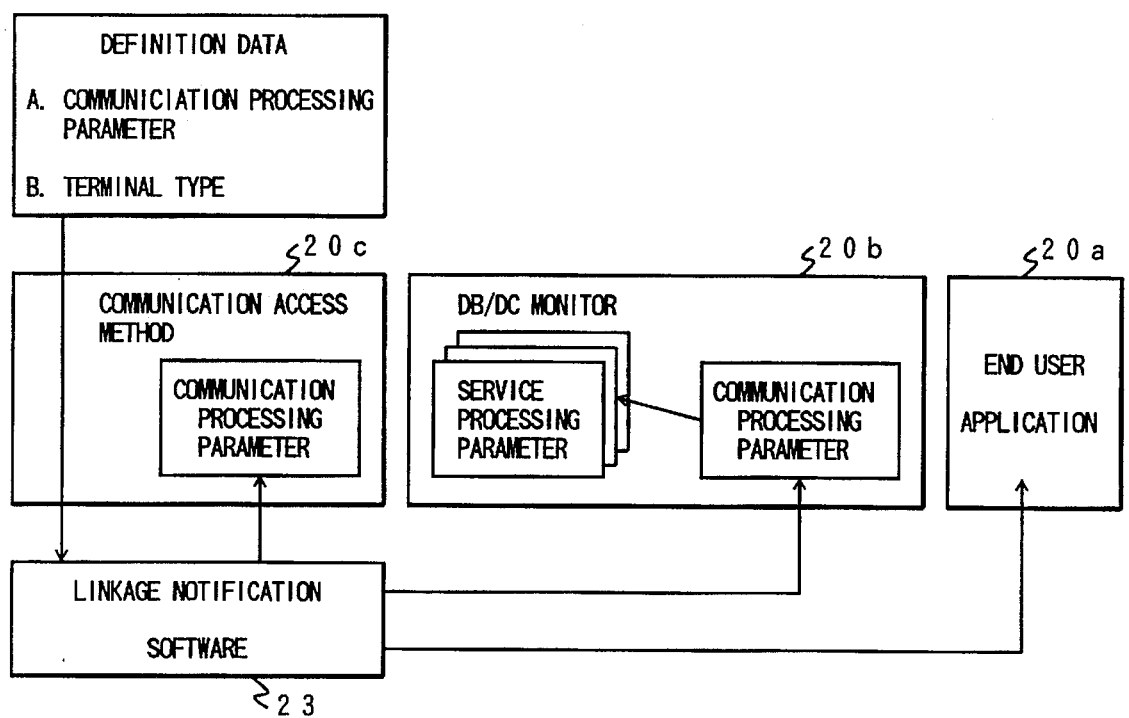
FIG. 4 is a processing explanatory diagram of assistance in explaining the processing executed in the data processing system in the second embodiment of the present invention.

The above-explained expansion of each definition parameter on the main memory will be outlined with reference to the drawings. If the communication access method 20c is employed as the "representative software", and when the data processing system 30 firstly starts up the data processing system 30, as illustrated in FIG. 3, only the service processing parameters are developed in the end user applications 20a and the DB/DC monitor 20b. Then, after entering the operation, as shown in FIG. 4, every time the terminal 25 is added, the communication processing parameters are registered in the end user applications 20a, the DB/DC monitor 20b and the communication access method 20c. Further, each time the terminal 25 is changed, these registered communication processing parameters are dynamically changed. Moreover, every time the terminal 25 is deleted, these registered communication processing parameters are dynamically deleted.

For actualizing the dynamic addition, change and deletion of the communication processing parameters, the operator inputs the types of the adding/changing/deleting target terminals and the ID data using the definition data input device 26. The operator then specifies whether the event occurred is the addition, the change or the deletion of the terminal 25 and input this. Subsequently, the operator inputs the communication processing parameters (which is unnecessary if the event is the deletion of the terminal 25) needed by each software 20 with respect to the adding/changing target terminals 25. These inputted items of data are, as illustrated in FIG. 4, inputted to the "representative software (the communication access method 20c)" from the definition input device 26 in the form of the "definition data". Note that operands representing the data for the same purpose can be, at this time, unified into one group. The "definition data" inputted in this manner to the "representative software (the communication access method 20c)" are transferred to the linkage notification section 23.

Figure 5:
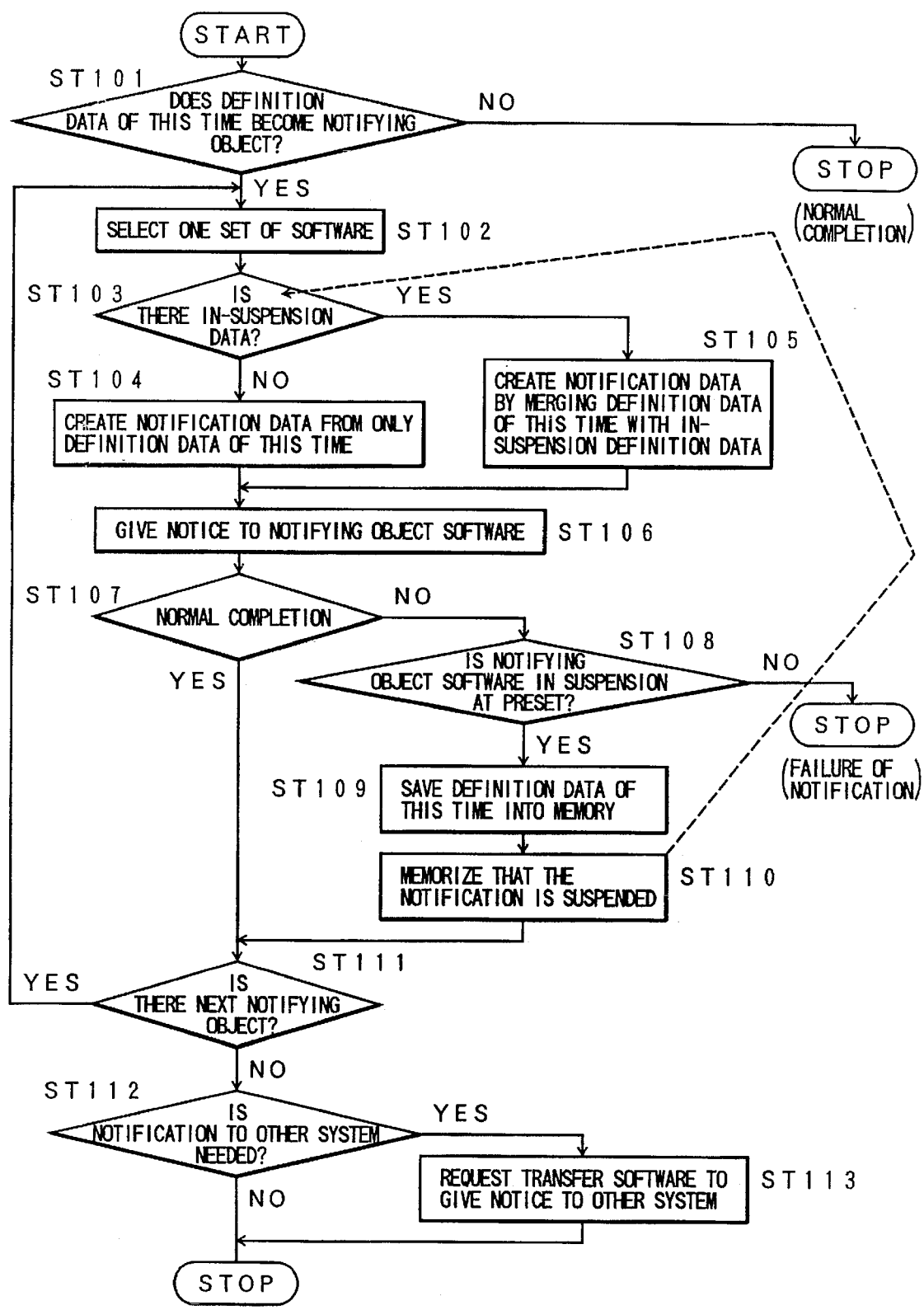
FIG. 5 is a flowchart showing the processing executed by a set of linkage notification section of FIG. 2.
Figure 6:
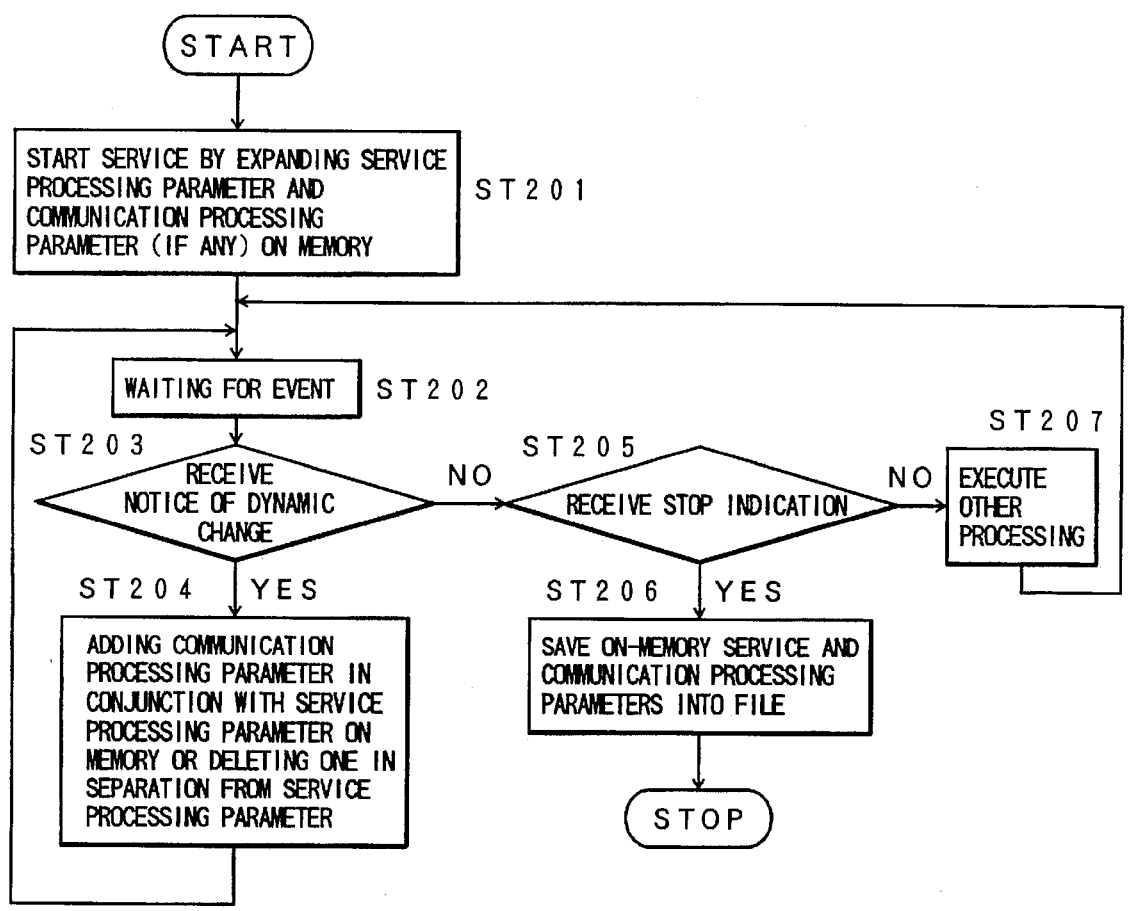
FIG. 6 is a flowchart showing the processing executed by each of definition section of FIG. 2.

FIG. 5 is a flowchart showing the processes executed by the linkage notification section 23. FIG. 6 is a flowchart showing the processes executed by the end user applications oriented definition section 21a, the DB/DC monitor oriented definition section 21b and the communication access oriented definition section 21c. Next, the expansion processing of the definition parameter onto the main memory and the dynamic change processing thereof in this embodiment will be explained in greater detail in accordance with those processing flowcharts.

The linkage notification section 23, when receiving the "definition data" from the communication access method 20c functioning as the "representative software", starts the processing flowchart of FIG. 5. Then, to start with, in step ST101, the linkage notification section 23 distinguishes whether or not the "definition data (containing the communication processing parameter, the terminal type, the ID data of the terminal 25 and the specified data of the event transferred from the communication access method 20c)" received in this time are object of notification. Subsequently, if the linkage notification section 23 determines that the "definition data" are not object of notification, the processing comes to an end as it is.

The linkage notification section 23, contrastingly when determining that the "definition data" are object of notification, executes a loop of processing from step ST102 to step ST111. This loop of processing is executed for each software 20.

In the first step ST102 in this loop, the linkage notification section 23 selects one set of software 20. In this selection of the software, the linkage notification section 23 preferably gives the priority according to the sequence of the end user applications 20a, the DB/DC monitor 20b and the communication access method 20c. The priority is also given to the end user applications 20a according to the order of implementing the service processing. The linkage notification section 23 selects one set of unselected software in accordance with the thus given priority.

In subsequent step ST103, the linkage notification section 23 distinguishes whether or not there exists in-suspension data in the "memory" with respect to the software 20 selected in step ST102 (see step ST110). Namely, the selected software 20 is suspended before this time of the execution of the processing flowchart, and, therefore, the linkage notification section 23 distinguishes whether or not there is the "definition data" which can not be notified to the software 20 in the "memory" (see step ST109).

If determining that there is no suspended data in step ST103, the linkage notification section 23, proceeds the processing to step ST104, and creates the "notification data" by using only the "definition data" received this time. Contrastingly if determining that there is the suspended data in step ST103, the linkage notification section 23 proceeds the processing to step ST105, and creates the "notification data" by merging the "definition data" received this time with the in-suspension "definition data" (see step ST109). When creating the "notification data" according to the processing of step ST104 or step ST105, the linkage notification section 23 notifies, in step ST106, the definition section 21 of the created "notification data", this mechanism 21 being provided corresponding to the set of software 20 selected in step ST102.

Subsequently, the linkage notification section 23 distinguishes whether or not the notification processing of step ST106 is normally completed in step ST107. The linkage notification section 23, if determining that the processing is normally completed, proceeds the processing to step ST111 as it is.

On the other hand, the linkage software 23, if determining that the notification processing to the set of software is not normally completed in step ST107, proceeds the processing to step ST108 and distinguishes whether or not the notifying object software is in suspension at present. If determining that the notifying object software is not in the suspension in step ST108, the linkage notification section 23 determines that the notification fails to perform and therefore finishes the processing. Contrastingly, the linkage notification section 23, if determining that the notifying object software is in the suspension in step ST108, proceeds the processing to step ST109 and saves the received "definition data" into the "memory". When saving this "definition data", an item of data for specifying the relevant software is appended to this "definition data". The linkage notification section 23 records the fact that the notification is suspended on the "memory" in next step ST110 and thereafter proceeds the processing step ST111.

In step ST111, the linkage notification section 23 distinguishes whether or not the unselected ones among the respective sets of notifying object software 20 are left. The linkage notification section 23, if determining that the unselected software 20 remains, proceeds the processing back to step ST102, wherein a loop of processing for the next software is performed.

As a result of executing the loop of processing from above steps ST102 through ST111, if completing the notification of the "notification data" to all of the end user application oriented definition section 21a, the DB/DC monitor oriented definition section 21b and the communication access method oriented definition section 21c, the linkage notification section 23 proceeds the processing to step ST112. In this step ST112, the linkage notification section 23 distinguishes whether or not the notification of the "definition data" received this time is required to be given to the other data processing system 30'. The linkage notification section 23, if determining that there is no necessity for notifying the other data processing system 30', finishes the processing as it is. The linkage notification section 23, contrastingly if determining that there is the necessity for notifying the other data processing system 30', proceeds the processing to step ST113 and therein issues a request for notification to the transfer software 24. Thereafter, the processing is ended.

Figure 7:
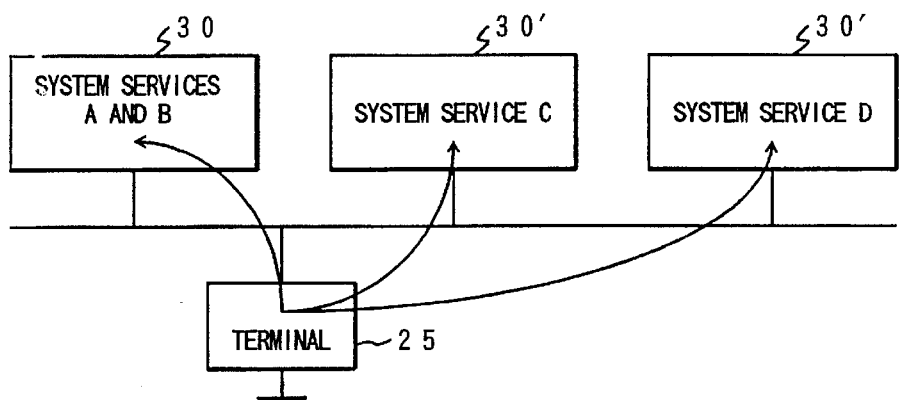
FIG. 7 is a processing explanatory diagram of assistance in explaining the processing in which the data processing system in the second embodiment of this invention notifies other data processing system of definition data.
Figure 8:
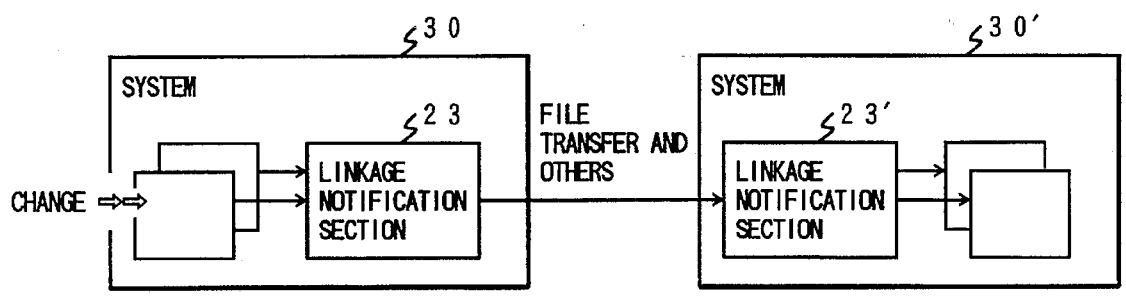
FIG. 8 is a processing explanatory diagram of assistance in explaining the processing in which the data processing system in the second embodiment of this invention notifies other data processing system of the definition data.

The following is the reason why the other data processing system 30' is notified of the "definition data". As illustrated in FIG. 7, the terminals 25 to be added, changed and deleted are, in some cases, associated with the service processing executed by the other data processing system 30' in addition to the service processing executed by the relevant data processing system 30. For this reason, in such a case, as shown in FIG. 8, the data processing system 30 notifies the linkage notification section 23' of the "definition data", which is provided in the other data processing system 30'.

Thus, the linkage notification section 23, when the terminal 25 is added, changed and deleted, perform the processing to notify the end user application oriented definition section 21a, the DB/DC monitor oriented definition section 21b and the communication access method oriented definition section 21c of the "definition data (containing the communication processing parameter, the terminal type, the ID data of the terminal 25 and the specified data of the event)" received from the communication access method 20c functioning as the "representative software".

Given next is a detailed explanation of the processing executed by the end user application oriented definition section 21a, the DB/DC monitor oriented definition section 21b and the communication access method oriented definition section 21c in accordance with the processing flow of FIG. 6.

Each of these definition sections 21 starts the processing of FIG. 6 with an actuation of the corresponding software 20. Then, each definition section 21, at first, in step ST201, starts the service by reading the service processing parameter from the service oriented parameter deck 22 and expanding the parameter on the main memory. Note that if the processing of this time is not for the first time after starting the operation of the data processing system 30, a possibility is high, wherein there exist the communication and service processing parameters saved on the unillustrated file. Then, if there exist the communication and service processing parameters saved on the unillustrated file, each definition section 21 expands the communication and service processing parameters on the main memory together with the linkage relationship therebetween and the ID data about the terminal 25.

Subsequently, each definition section 21 waits for an occurrence of some event in step ST202. Then, if some event occurs, the processing is proceeded to step ST203. In step ST203, each definition section 21 distinguishes whether or not the event occurred indicates a receipt of the "notification data" requiring a dynamic change of the communication processing parameter.

In step ST203, if determining that the event occurred is the receipt of the "notification data" requiring the dynamic change of the communication processing parameter, each definition section 21 proceeds the processing to step ST204. In this step ST204, each definition section 21 specifies ID of the terminal 25 relative to the "notification data" on the basis of the received "notification data". Then, if the received "notification data" is an item of data about the addition or the change of the terminal 25, the communication processing parameter contained in the "notification data" is expanded while the definition section 21 relating the same parameter to ID described above. Particularly if the definition section 21 is the end user application oriented definition section 21a or the DB/DC monitor oriented definition section 21b, the service processing parameter associated with the terminal 25 relative to the relevant "notification data" is specified based on the "terminal type" data contained in the received "notification data". Thus specified service processing parameter is linked to the above-described expanded communication processing parameter. On the other hand, if the received "notification data" is an item of data about the deletion of the terminal 25, there is deleted the communication processing parameter related to ID described above. Especially if the definition section 21 is the end user application oriented definition section 21a or the DB/DC monitor oriented definition section 21b, the service processing parameter associated with the terminal 25 relative to the "notification data" is specified based on the "terminal type" data contained in the received "notification data". The specified service processing parameter is delinked from the communication parameter associated with the terminal 25. The definition section 21 thus dynamically changes the communication processing parameter. Then, the definition section 21 proceeds the processing back to step ST202 and waits for an occurrence of the next event.

On the other hand, in step ST203, if determining that the event occurred is not the receipt of the "notification data" requiring the dynamic change of the communication processing parameter, the definition section 21 proceeds the processing to step ST205. In this step ST205, the definition section 21 distinguishes whether or not the event occurred is a receipt of an indication to suspend the corresponding software 20.

The definition section 21, if determining that the event occurred is the receipt of the indication to suspend the corresponding software 20, proceeds the processing to step ST206. In this step ST206, the definition section 21 saves the service and communication processing parameters expanded in the areas of the main memory with respect to the corresponding software 20 onto the unillustrated file together with the linkage relationship therebetween and the ID data about the terminal 25. Thereafter, the processing comes to an end.

On the other hand, in step ST205, the definition section 21, if determining that the event occurred is not the receipt of the indication of suspension, executes the processing corresponding to the event occurred in step ST207. The processing is then returned to step ST202.

The processing of FIG. 6 is executed in this manner. The end user application oriented definition section 21a, the DB/DC monitor oriented definition section 21b and the communication access method oriented definition section 21c thereby perform the processing to dynamically change the communication processing parameters needed by each software 20 and the linkage relationship therebetween in accordance with the "notification data" notified from the linkage notification section 23.

Note that the linkage notification section 23 executes the processing to give a notice of the "notification data" according to a sequence such as "End User Application 20a→DB/DC Monitor 20b→Communication Access Method 20c" on the occasion of the dynamic change processing of this communication processing parameter, and, therefore, the service by the end user application 20a is started immediately when the end user application 20a perform a definition change. Hence, a retry of an inquiry for the added terminal 25 as a part of the service processing can be started. For this reason, when completing the definition change by the communication access method 20c, the inquiry is immediately delivered to the added terminal 25. Accordingly, the service relative to the terminal 25 can be started at once.

As discussed above, according to the present invention, the data processing system adopts the construction to implement the service processing in accordance with the functionally hierarchized software group while executing the communication processing for the communication with the plurality of terminals connected to the data processing system. Even in this data processing system, when the terminal is changed, the definition parameter required by each software can be dynamically changed without causing the out-of-synchronism state in accordance with the simple construction.

This invention being thus described, it will be obvious that the same may be varied in same ways. Such variations are not to be regarded as a departure for the spirit and scope of the invention, and all such modifications as would be obvious to one skilled in the art are intended to be included within the scope of the following claims.

What is claimed is:

1. A data processing system for implementing service processing while executing communication processing for communication with a terminal connected to the data processing system, said system comprising:

means for expanding a service processing parameter needed by software for executing the service processing while relating the service processing parameter to the software;

means for receiving, when an additional terminal is connected to said system, a communication processing parameter required for communication processing with the additional terminal, and data for specifying the service processing to be executed with respect to the additional terminal; and means for registering the communication processing parameter received by said receiving means and linking the communication processing parameter to the service processing parameter corresponding to the service processing specified by the service specification data received by said receiving means, said service processing parameter being expanded by said expanding means.

2. A data processing system according to claim 1, wherein plural sets of software for executing the service processing are simultaneously executed.

3. A data processing system according to claim 2, wherein said expanding means and said registering means are provided per plural sets of software.

4. A data processing system according to claim 1, wherein said receiving means, when changing a connected terminal, receives the communication processing parameter needed for the communication processing with the terminal and the data for specifying the service processing to be executed with respect to the changed terminal, and said registering means re-registers the communication processing parameter received by said receiving means and re-links the communication processing parameter to the service processing parameter corresponding to the service processing specified by the service specification data received by said receiving means.

5. A data processing system according to claim 1, wherein said receiving means includes the data for specifying the terminal to be added.

6. A data processing system according to claim 1, which comprises a plurality of software programs, wherein each software program is capable of executing a plurality of service processes, and the service processing parameter is different for every service process.

7. A data processing system for implementing service processing in accordance with a functionally hierarchized software group while executing communication processing for communication with a terminal connected to the data processing system, each software program of the software group requiring a definition parameter separated into a communication processing parameter needed for the communication processing and a service processing parameter needed for the service processing with the terminal, said system comprising:

means for receiving, when a terminal is added, the communication processing parameter about the terminal, and specification data about the service processing parameter as an object for combination with the communication processing parameter, and when a terminal is deleted, receiving only specification data corresponding to the type of terminal being deleted;

means for notifying each software program of the data received by said receiving means; and means for registering the communication processing parameter received by said receiving means while linking the communication processing parameter to the service processing parameter corresponding to the service processing specified by the service specification data received by said receiving means, and for executing dynamic change processing of the communication processing parameter to be combined with the service processing parameter in connection with a development of each software program according to data notified by said notifying means, said registering means being provided so as to correspond to each software program.

8. A data processing system according to claim 7, wherein one set of software in the functionally hierarchized software group is structured to incorporate a function of said receiving means.

9. A data processing system according to claim 7, wherein said notifying means performs processing to save, if there exists in-suspension software, data to be notified and notifies the in-suspension software, when starting the relevant software, of the saved data.

10. A data processing system according to claim 7, wherein said notifying means performs processing to select a software program from the software group in accordance with the order of implementing the service processing and to notify the software program of the data received by said receiving means in accordance with the selection order thereof.

11. A data processing system according to claim 7, wherein said notifying means performs processing to notify another data processing system of the data received by said receiving means.

12. A data processing system for implementing service processing while executing communication processing for communication with a terminal connected to the data processing system, said system comprising:

means for expanding a service processing parameter needed software for executing the service processing while relating the service processing parameter to the software;

means for receiving, when an additional terminal is connected to said system, a communication processing parameter required for communication processing with the additional terminal, and data for specifying the service processing executed with respect to the additional terminal; and means for registering the communication processing parameter received by said receiving means and linking the communication processing parameter to the service processing parameter corresponding to the service processing specified by the service specification data received by said receiving means, said service processing parameter being expanded by said expanding means;

the service processing being simultaneously executed by plural sets of software, each of said plural sets of software being provided with said expanding means and said registering means, and being further provided with notifying means for notifying each of said registering means of the communication processing parameter received by said receiving means and the data for specifying the service processing.

13. A data processing system according to claim 12, wherein said notifying means transmits the data received from said receiving means to another data processing system.

14. A data processing system for implementing service processing while executing communication processing for communication with a terminal connected to the data processing system, said system comprising:

means for expanding a service processing parameter needed software for executing the service processing while relating the service processing parameter to the software;

means for receiving, when an additional terminal is connected to said system, a communication processing parameter required for communication processing with the additional terminal, and data for specifying the service processing executed with respect to the additional terminal, and when changing a connected terminal, receiving the communication processing parameter needed for communication processing with the changed terminal and the data for specifying the service processing executed with respect to the changed terminal; and means for registering the communication processing parameter received by said receiving means and linking the communication processing parameter to the service processing parameter corresponding to the service processing specified by the service specification data received by said receiving means, said service processing parameter being expanded by said expanding means, and when changing a connected terminal, said registering means re-registering the communication processing parameter received by said receiving means and re-linking the communication processing parameter to the service processing parameter corresponding to the service processing specified by the service specification data received by said receiving means.

15. A data processing system according to claim 14, wherein said receiving means, when deleting a connected terminal, receives the data for specifying the service processing executed with respect to the terminal to be deleted, and said registering means deletes the communication processing parameter for the terminal to be deleted, which is linked to the service processing parameter corresponding to the service processing specified by the service specification data received by said receiving means.

16. A data processing system according to claim 15, wherein said receiving means receives the data for specifying whether the terminal is added, changed or deleted.

* * * * *